US006914718B2

(12) United States Patent
Kasahara et al.

(10) Patent No.: US 6,914,718 B2
(45) Date of Patent: Jul. 5, 2005

(54) OPTICAL REPEATING SYSTEM AND OPTICAL AMPLIFYING REPEATER CONTROL METHOD

(75) Inventors: Yasunori Kasahara, Tokyo (JP); Hideki Goto, Tokyo (JP); Takashi Mizuochi, Tokyo (JP); Kenkichi Shimomura, Tokyo (JP); Yukio Horiuchi, Saitama (JP); Masatoshi Suzuki, Saitama (JP); Toshio Kawazawa, Tokyo (JP); Daishi Ishii, Tokyo (JP)

(73) Assignees: Mitsubishi Denki Kabushiki Kaisha, Tokyo (JP); KDDI Corporation, Tokyo (JP); KDDI Submarine Cable Systems Inc., Tokyo (JP)

(*) Notice: Subject to any disclaimer, the term of this patent is extended or adjusted under 35 U.S.C. 154(b) by 355 days.

(21) Appl. No.: 10/192,703

(22) Filed: Jul. 11, 2002

(65) Prior Publication Data
US 2003/0011879 A1 Jan. 16, 2003

(30) Foreign Application Priority Data
Jul. 11, 2001 (JP) ........................ 2001-211181

(51) Int. Cl.[7] .................... H01S 3/00; H04B 10/08
(52) U.S. Cl. ........................ 359/337; 398/30
(58) Field of Search ..................... 359/337; 398/30

(56) References Cited

U.S. PATENT DOCUMENTS

| | | | |
|---|---|---|---|
| 5,500,756 A | 3/1996 | Tsushima et al. | 359/174 |
| 5,502,810 A | 3/1996 | Watanabe | 359/177 |
| 5,657,154 A | 8/1997 | Yoneyama | 359/341 |
| 5,812,289 A * | 9/1998 | Tomooka et al. | 398/92 |
| 6,025,949 A | 2/2000 | Anderson | 359/179 |
| 6,075,633 A | 6/2000 | Deguchi et al. | 359/133 |

FOREIGN PATENT DOCUMENTS

| | | | |
|---|---|---|---|
| EP | 0 552 937 | 7/1993 | .......... H04B/10/16 |
| JP | 4-371030 | 12/1992 | .......... H04B/10/08 |
| JP | 04-371030 | * 12/1992 | .......... H04B/10/08 |
| JP | 5-199184 | 8/1999 | .......... H04B/10/16 |

OTHER PUBLICATIONS

U.S. Appl. No. 10/191,319.*
U.S. Appl. No. 10/192,705.*
U.S. Appl. No. 10/192,703.*
Patent Abstracts of Japan, JP 04–160825, Jun. 4, 1992.
Patent Abstracts of Japan, JP 04–160824, Jun. 4, 1992.
A. Hadjifotiou, et al., Proceedings of the Conference on Telecommunications, XP–000473700, pp. 53–56, "Supervisory Options for Fibre Optical Amplifier Systems", Apr. 18, 1993.

* cited by examiner

Primary Examiner—Thomas H. Tarcza
Assistant Examiner—Deandra M. Hughes
(74) Attorney, Agent, or Firm—Oblon, Spivak, McClelland, Maier & Neustadt, P.C.

(57) ABSTRACT

In an optical repeating system including an optical transmitter and optical amplifying repeaters, the optical transmitter specifies one optical amplifying repeater, and transmits to the optical amplifying repeater a supervisory command to supervise internal circuits of the optical amplifying repeater and a control command to control amplification factors of optical amplifiers of the optical amplifying repeater as a first sub-signal. Receiving the supervisory command via an optical transmission line, the optical amplifying repeater transmits a supervisory signal indicating a supervisory result corresponding to the supervisory command to optical receivers via optical transmission lines as a second sub-signal. Receiving the control command via the optical transmission line, the optical amplifying repeater is controlled to change amplification factors of the optical amplifiers in response to the control command.

3 Claims, 6 Drawing Sheets

OPTICAL REPEATING SYSTEM AND OPTICAL AMPLIFYING REPEATER CONTROL METHOD

BACKGROUND OF THE INVENTION

1. Field of the Invention

The present invention relates to an optical repeating system that comprises an uplink optical transmission line, a downlink optical transmission line, an optical transmitter and an optical receiver for transferring a main signal through the uplink or downlink optical transmission line, and a plurality of optical amplifying repeaters for amplifying and repeating the main signal with optical amplifiers at intermediate positions on the optical transmission lines, and to an optical amplifying repeater control method for controlling the optical amplifying repeaters.

2. Description of Related Art

FIG. 4 is a block diagram showing a configuration of a conventional optical repeating system disclosed in JP2716882B2. In FIG. 4, the reference numeral 1 designates an optical transmitter for transmitting a main signal conveying information and a first sub-signal bearing a command for an optical amplifying repeater 3; 2 designates an optical fiber constituting an optical transmission line for interconnecting the optical transmitter 1, optical amplifying repeaters 3 and an optical receiver 4; 3 designates an optical amplifying repeater located at an intermediate position on the optical fiber 2 for not only amplifying and transmitting the main signal with an optical amplifier, but also for superimposing the supervisory information obtained from the command conveyed by the first sub-signal on the main signal as a second sub-signal, and 4 designates an optical receiver for receiving the main signal and the like.

FIG. 5 is a block diagram showing a configuration of the optical amplifying repeater as shown in FIG. 4. In the optical amplifying repeater 3 as shown in FIG. 5, the reference numeral 101 designates a coupler for splitting the input optical signal; 102 designates an optical amplifier comprising an isolator 111, a pumping laser diode 112, a multiplexing filter 113, an erbium (Er) doped optical fiber 114, and an isolator 115; and 103 designates a coupler for splitting an optical signal output from the optical amplifier 102, and for outputting its first part as the output optical signal.

In FIG. 5, the reference numeral 121 designates a photoelectric converter for converting an optical signal to an electrical signal; 122 designates an amplifier for amplifying the electrical signal; 123 designates a low-pass filter for filtering the sub-signal; 124 designates an incoming call identification circuit for making a decision as to whether the first sub-signal contains an operation command signal addressed to the present repeater; 125 designates a controller for actuating an encoder 131 and a modulator 132 in response to the operation command signal addressed to the present repeater; 131 designates the encoder for encoding intra-repeater information such as the power level of the output optical signal of the optical amplifying repeater 3, the amplification factor of the optical amplifier 102, the driving current level and temperature of the pumping laser diode 112; and 132 designates the modulator for modulating the driving current to be supplied from the pumping laser diode driver 133 to the pumping laser diode 112 by a supervisory signal including the intra-repeater information after encoding. The reference numeral 134 designates a temperature controller for controlling the temperature of the pumping laser diode 112; 141 designates a photoelectric converter for converting an optical signal to an electrical signal; and 142 designates an amplifier for amplifying the electrical signal.

FIG. 6 is a block diagram showing a configuration of the optical transmitter 1 in FIG. 4. In the optical transmitter 1 of FIG. 6, the reference numeral 201 designates a main signal circuit for outputting the main signal used for information transmission; 202 designates a sub-signal circuit for outputting the first sub-signal containing the operation command that specifies the optical amplifying repeater; 203 designates a modulator for superimposing the first sub-signal on the main signal in a prescribed modulating scheme; 204 designates a driver supplied with the main signal on which the first sub-signal is superimposed for driving a semiconductor laser 205; and 205 designates the semiconductor laser for supplying the optical fiber 2 with the optical signal corresponding to the applied electrical signal.

FIG. 7 is a block diagram showing a configuration of the optical receiver in FIG. 4. In the optical receiver 4 of FIG. 7, the reference numeral 301 designates a photoelectric converter for converting the input optical signal fed from the optical fiber 2 to an electrical signal; 302 designates an amplifier for amplifying the electrical signal; 303 designates a main signal demodulator for demodulating the main signal in the received signal; 304 designates a low-pass filter for filtering the first and second sub-signals in the received signal; and 305 designates a sub-signal demodulator for demodulating the first and second sub-signals in the received signal.

Next, the operation of the conventional optical repeating system will be described.

First, the operation of the optical transmitter 1 will be described. The sub-signal circuit 202 generates the first sub-signal, which includes the operation command specifying one of the optical amplifying repeaters 3 by an address code uniquely assigned to each optical amplifying repeater, in such a manner that its amplitude is smaller and its rate is lower than those of the main signal output from the main signal circuit 201. Then, the modulator 203 supplies the driver 204 with the main signal on which the first sub-signal is superimposed. The output optical signal of the semiconductor laser 205 consists of the modulation signal of the main signal plus the first sub-signal superimposed thereon. The optical transmitter 1 transmits the operation command to the next optical amplifying repeater 3 as the first sub-signal in such a manner that an appropriate time interval is reserved after the first sub-signal including the operation command. The reserved time interval enables the specified optical amplifying repeater 3 to transmit a supervisory signal corresponding to the first sub-signal during the reserved time interval as the second sub-signal.

Next, the operation of the optical amplifying repeater 3 will be described. The coupler 101 splits the input optical signal fed from the input side optical fiber 2. A first part of the split input optical signal is launched into the optical amplifier 102 to be amplified. On the other hand, a second part of the split input optical signal is launched into the photoelectric converter 121 to be converted to the electrical signal. The electrical signal is amplified by the amplifier 122, and then the low-pass filter 123 extracts the first sub-signal with a frequency lower than the frequency of the main signal, and supplies it to the incoming call identification circuit 124. The incoming call identification circuit 124 makes a decision as to whether the optical transmitter 1 sends the operation command to this repeater from the address code contained in the first sub-signal, and notifies the controller 125 of the decision result. When the operation command is addressed to the repeater, the controller 125 actuates the encoder 131 and the modulator 132 to modulate the driving current to be supplied from the pumping laser diode driver 133 to the pumping laser diode 112 by the second sub-signal including the intra-repeater information. Since the driving current to the pumping laser diode 112 is modulated by the second sub-signal, the amplification factor of the optical amplifier 102 is modulated. Thus, the optical signal output from the optical amplifier 102 consists of the main signal and he second sub-signal superimposed thereon. On the other hand, when there is no operation command addressed to the repeater, the controller 125 does not actuate the encoder 131 nor the modulator 132. As a result, the pumping laser diode 112 is driven by a non-modulated driving current.

Finally, the operation of the optical receiver 4 will be described. The input optical signal fed from the optical fiber 2 is converted by the photoelectric converter 301 into an electrical signal which is amplified by the amplifier 302. The amplified electrical signal is supplied to the main signal demodulator 303. In parallel with this, the low-pass filter 304 extracts the first and second sub-signals from the electrical signal, and supplies them to the sub-signal demodulator 305. The sub-signal demodulator 305 demodulates the operation command, which is addressed to the optical amplifying repeater 3, from the first sub-signal transmitted from the optical transmitter 1, and the intra-repeater information from the second sub-signal transmitted from the optical amplifying repeater 3. Thus, the operation state of each optical amplifying repeater 3 can be supervised.

In this way, the optical transmitter 1 selects one of the optical amplifying repeaters 3 one by one, and transmits the operation command by superimposing it on the main signal. Receiving the operation command addressed to it, each optical amplifying repeater 3 superimposes the supervisory information about the repeater on the main signal, and sends it to the optical receiver 4. The optical receiver 4 demodulates the supervisory information sent from the optical amplifying repeaters 3 sequentially.

With the foregoing configuration, the conventional optical repeating system can supervise each of the optical amplifying repeaters 3. However, the conventional optical repeating system has a problem in that it is difficult to adjust the amplification factor of the optical amplifier 102 of the optical amplifying repeater 3, and to stabilize the amplification characteristics of the optical amplifying repeater 3 over the long run.

SUMMARY OF THE INVENTION

The present invention is implemented to solve the foregoing problem. It is therefore an object of the present invention to provide an optical repeating system and optical amplifying repeater control method capable of stabilizing the amplification characteristics of the optical amplifying repeaters by adjusting the amplification factors of the optical amplifiers of the optical amplifying repeaters.

According to a first aspect of the present invention, there is provided an optical repeating system comprising: an uplink optical transmission line; a downlink optical transmission line; an optical transmitter and an optical receiver for transmitting and receiving a main signal via at least one of the uplink and downlink optical transmission lines; and a plurality of optical amplifying repeaters each installed at an intermediate position on the optical transmission lines for amplifying and repeating the main signal with optical amplifiers, wherein the optical transmitter specifies one of the plurality of optical amplifying repeaters, and transmits a first sub-signal containing at least one of a supervisory command and a control command to the specified optical amplifying repeater, the supervisory command commanding to supervise internal circuits of the optical amplifying repeater, and the control command commanding to control amplification factors of the optical amplifiers, and wherein the optical amplifying repeater transmits, when receiving the supervisory command via one of the uplink and downlink optical transmission lines, a second sub-signal to the optical receiver via the uplink optical transmission line and the downlink optical transmission line, the second sub-signal containing a supervisory signal indicating supervisory result corresponding to the supervisory command, and controls, when receiving the control command via one of the uplink and downlink optical transmission lines, the amplification factors of the optical amplifiers in response to the control command.

Here, the optical amplifying repeater may comprise a controller for controlling the amplitude intensity of the supervisory signal in response to the control command.

The optical repeating system may further comprise a feeder line installed along the optical transmission lines; and a feeding circuit installed at each end of the feeder line for feeding the plurality of optical amplifying repeaters with a current via the feeder line.

According to a second aspect of the present invention, there is provided an optical amplifying repeater control method of controlling an optical amplifying repeater in an optical repeating system including an uplink optical transmission line, a downlink optical transmission line, an optical transmitter and an optical receiver for transmitting and receiving a main signal via at least one of the uplink and downlink optical transmission lines, and a plurality of optical amplifying repeaters each installed at an intermediate position on the optical transmission lines for amplifying and repeating the main signal with optical amplifiers, the optical amplifying repeater control method comprising the steps of: specifying one of the plurality of optical amplifying repeaters, and transmitting a first sub-signal containing at least one of a supervisory command and a control command to the specified optical amplifying repeater by the optical transmitter, the supervisory command commanding to supervise internal circuits of the optical amplifying repeater, and the control command commanding to control amplification factors of the optical amplifiers; receiving at least one of the supervisory command and the control command by the optical amplifying repeater via one of the uplink and downlink optical transmission lines; and transmitting, when the optical amplifying repeater receives the supervisory command via one of the uplink and downlink optical transmission lines, a second sub-signal to the optical receiver via the uplink optical transmission line and the downlink optical transmission line, the second sub-signal containing a supervisory signal indicating supervisory result corresponding to the supervisory command, and controlling, when the optical amplifying repeater receives the control command via one of the uplink and downlink optical transmission lines, the amplification factors of the optical amplifiers in response to the control command.

DETAILED DESCRIPTION OF THE PREFERRED EMBODIMENT

The invention will now be described with reference to the accompanying drawings.

Figure 1:
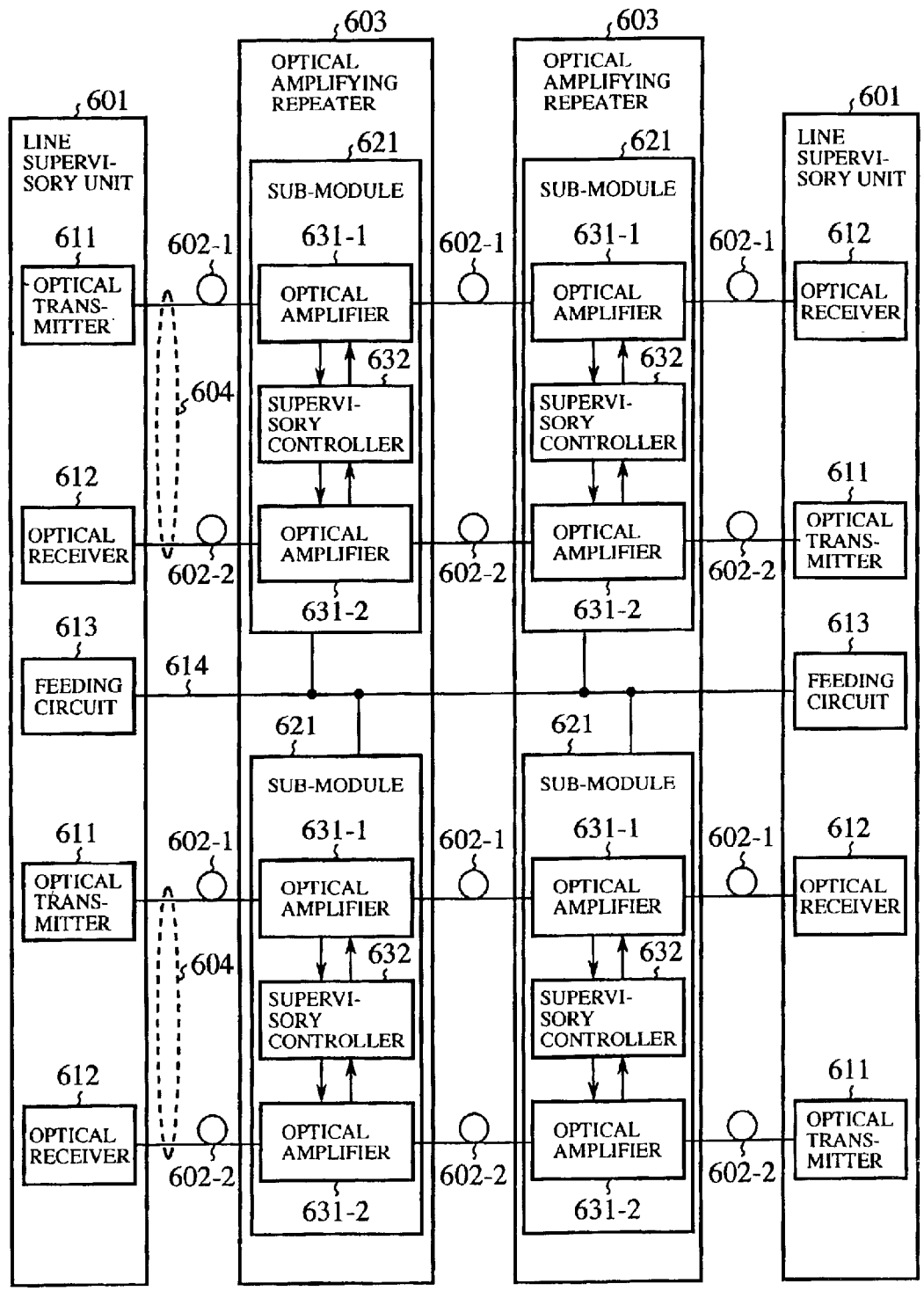
FIG. 1 is a block diagram showing a configuration of an embodiment 1 of the optical repeating system in accordance with the present invention.
Figure 6:
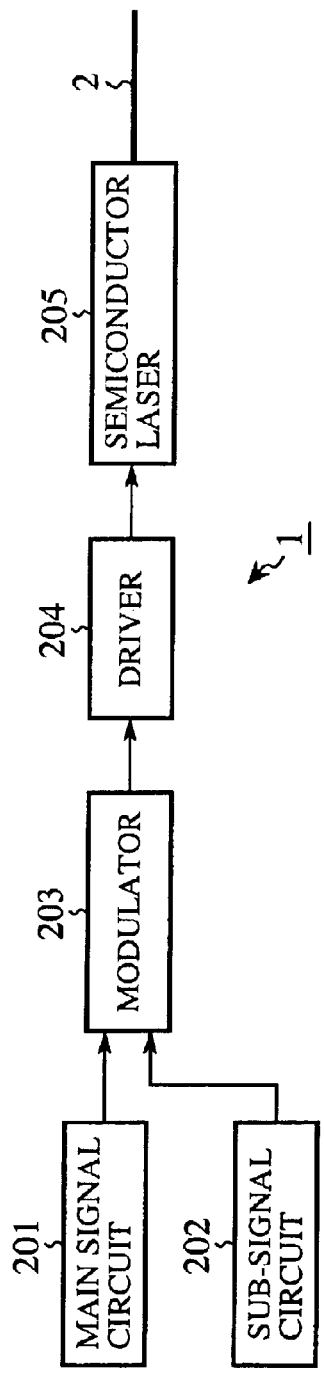
FIG. 6 is a block diagram showing a configuration of the optical transmitter of FIG. 4.
Figure 7:
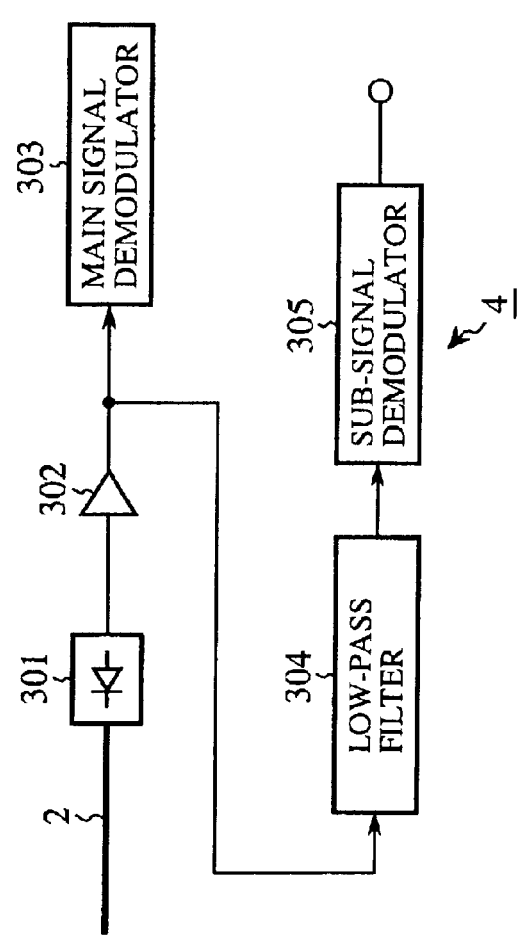
FIG. 7 is a block diagram showing a configuration of the optical receiver of FIG. 4.

FIG. 1 is a block diagram showing a configuration of an embodiment 1 of the optical repeating system in accordance with the present invention. In FIG. 1, the reference numeral 601 designates a line supervisory unit. The line supervisory unit 601 comprises optical transmitters 611 and optical receivers 612 serving as terminals of uplink and downlink bidirectional optical transmission lines, each of which consists of the optical fibers 602-1 and 602-2. The line supervisory unit 601 further comprises a feeding circuit 613 for supplying current to each optical amplifying repeater 603 via a feeder line 614. Here, the optical transmitters 611 and optical receivers 612 have the same configuration as those of FIGS. 6 and 7.

In FIG. 1, reference numerals 602-1 and 602-2 each designate an optical fiber constituting the bidirectional optical transmission line; and 603 designates an optical amplifying repeater that amplifies main signals on a plurality of bidirectional optical transmission lines, and that comprises a plurality of sub-modules 621 for receiving the first sub-signal and carries out the processing thereof. In FIG. 1, a pair of the bidirectional optical transmission lines are installed, where each bidirectional optical transmission line is defined as an optical fiber pair 604 consisting of the optical fiber 602-1 and optical fiber 602-2.

In each sub-module 621, the reference numeral 631-1 designates an optical amplifier mounted on the uplink optical transmission line (optical fiber 602-1) for amplifying the main signal; 631-2 designates an optical amplifier mounted on the downlink optical transmission line (optical fiber 602-2) for amplifying the main signal; and 632 designates a supervisory controller that transmits, when receiving the supervisory command addressed to the repeater from the optical transmitter 611 via the uplink optical transmission line or the downlink optical transmission line, the supervisory signal indicating the supervisory result corresponding to the supervisory command to the optical receivers 612 via the uplink optical transmission line and downlink optical transmission line as the second sub-signal, and that controls, when receiving the control command via the uplink optical transmission line (or the downlink optical transmission line), the amplification factor of the optical amplifier 631-1 (optical amplifier 631-2) in accordance with the control command.

Figure 2:
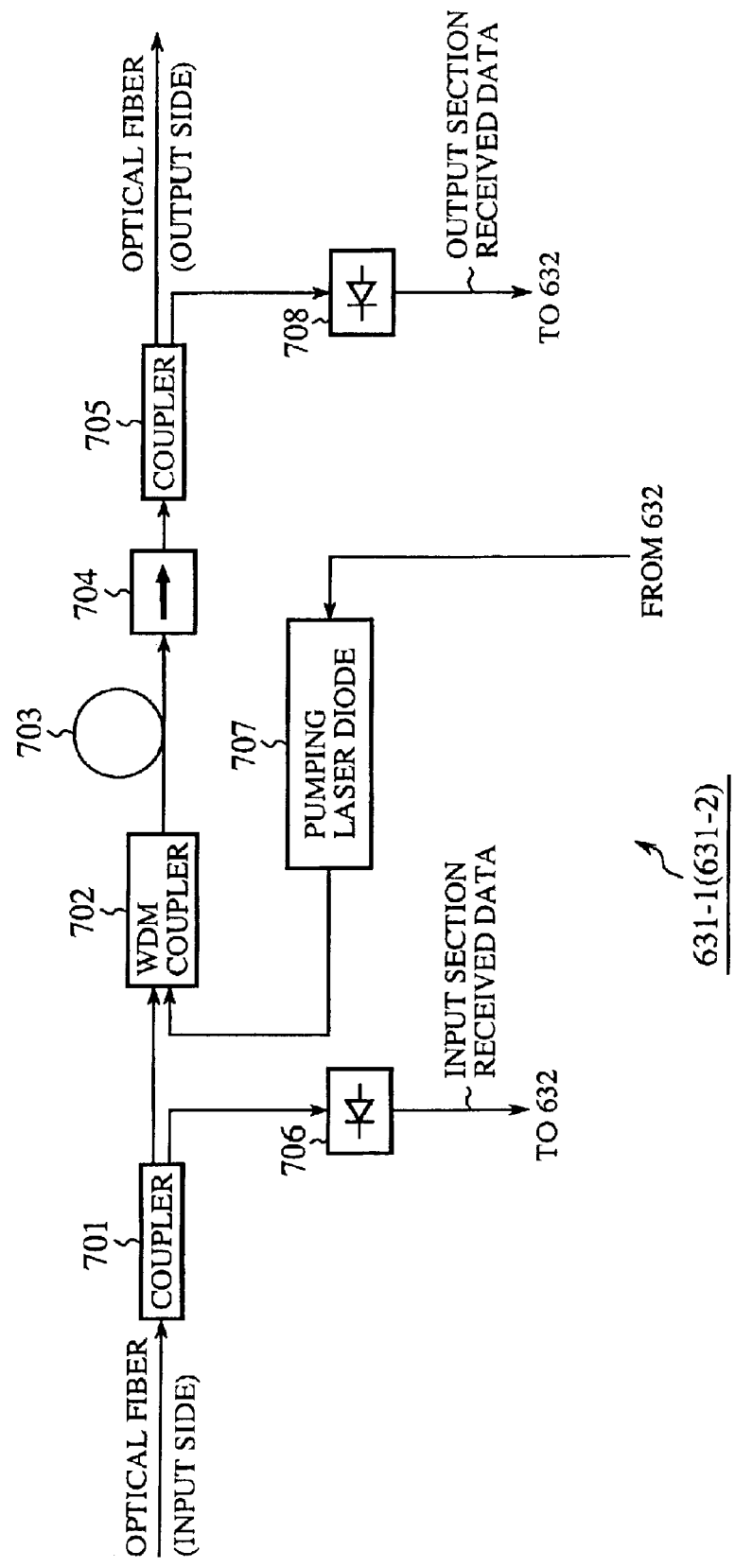
FIG. 2 is a block diagram showing a configuration of an optical amplifier of FIG. 1.

FIG. 2 is a block diagram showing a configuration of the optical amplifier 631-1 or 631-2 as shown in FIG. 1. In FIG. 2, the reference numeral 701 designates a coupler for splitting the input optical signal; 702 designates a WDM (Wavelength Division Multiplexing) coupler for combining the optical signal with the pumping laser light; 703 designates an erbium (Er) doped fiber; 704 designates an isolator; and 705 designates a coupler for splitting the amplified optical signal, and outputting its first part as the output optical signal. The reference numeral 706 designates a photoelectric converter for converting the optical signal into an electrical signal; 707 designates a pumping laser diode for applying the pumping laser light to the erbium (Er) doped fiber 703 via the WDM coupler 702; and 708 designates a photoelectric converter for converting the optical signal to an electrical signal.

Figure 3:
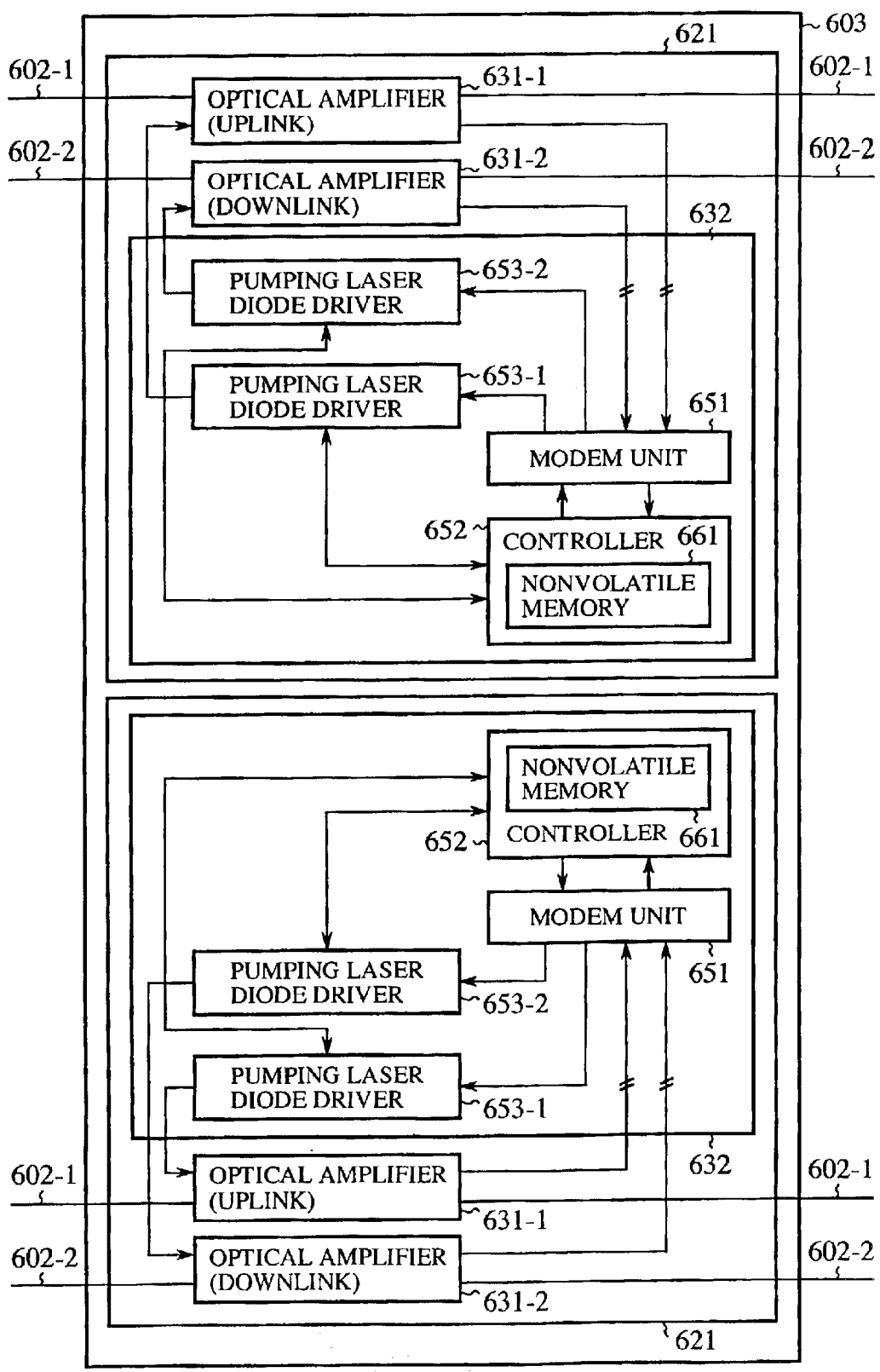
FIG. 3 is a block diagram showing a configuration of an optical amplifying repeater of FIG. 1.
Figure 4:
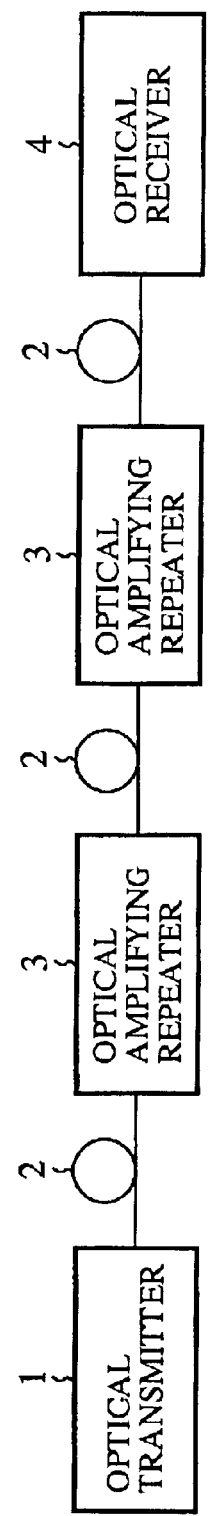
FIG. 4 is a block diagram showing a configuration of a conventional optical repeating system.
Figure 5:
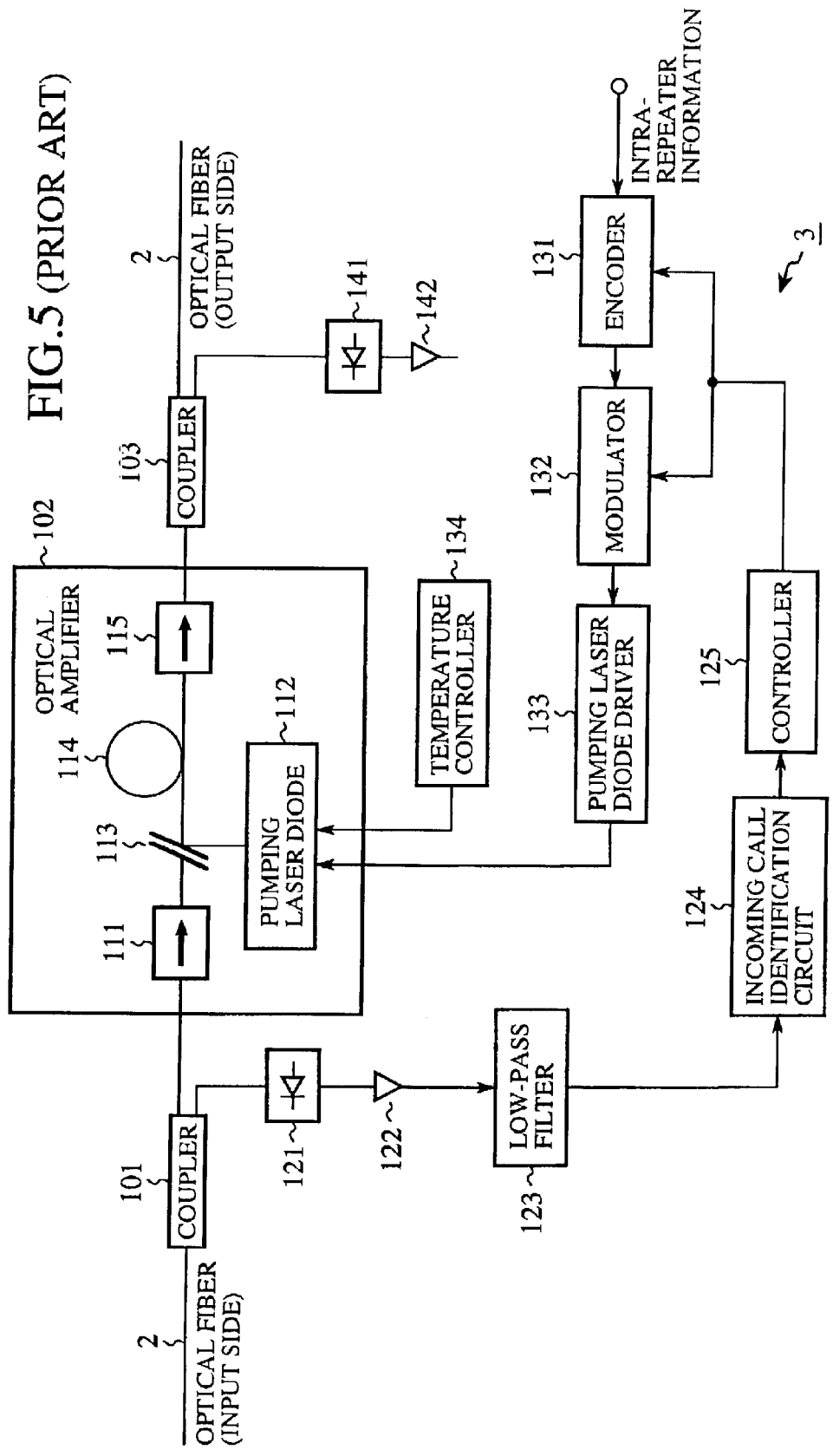
FIG. 5 is a block diagram showing a configuration of an optical amplifying repeater of FIG. 4.

FIG. 3 is a block diagram showing a configuration of the optical amplifying repeater 603 as shown in FIG. 1. In FIG. 3, the reference numeral 651 designates a modem unit. The modem unit 651 extracts and demodulates the first sub-signal sent from the optical transmitter 611 of the line supervisory unit 601. It also modulates the driving current to the pumping laser diode 707 by the supervisory signal that includes various items of the intra-repeater information corresponding to the supervisory command. It carries out the modulation by controlling the pumping laser diode drivers 653-1 and 653-2, thereby superimposing the supervisory signal on the main signal as the second sub-signal. The reference numeral 652 designates a controller that operates as follows. When detecting the supervisory command addressed to the repeater from the first sub-signal, the controller 652 collects the intra-repeater information, and supplies the modem unit 651 with the supervisory signal indicating the intra-repeater information. On the other hand, when detecting the control command addressed to the repeater from the first sub-signal, it controls the amplification factors of the pumping laser diode drivers 653-1 and 653-2, thereby controlling the optical amplifiers 631-1 and 631-2. The reference numeral 661 designates a nonvolatile memory such as an FRAM (Ferro-electric Random Access Memory) and MRAM (Magneto-resistive Random Access Memory) for storing the set values of the amplification factors of the optical amplifiers 631-1 and 631-2, the intra-repeater information and the like. The reference numeral 653-1 designates the pumping laser diode driver for supplying the driving current to the pumping laser diode 707 of the optical amplifier 631-1; and 653-2 designates a pumping laser diode driver for supplying the driving current to the pumping laser diode 707 of the optical amplifier 631-2.

Next, the operation of the present embodiment 1 will be described.

The feeding circuits 613 of the line supervisory units 601 at both ends of the optical transmission line feed a current to the individual optical amplifying repeaters 603 through the feeder line 614.

Then, the optical transmitter 611 of the line supervisory unit 601 transmits the main signal to the optical receiver 612 of the far-end line supervisory unit 601. In addition, when transmitting a supervisory command or control command to a specified optical amplifying repeater 603, the optical transmitter 611 superimposes on the main signal the first sub-signal that contains the address code uniquely assigned to the specified optical amplifying repeater 603 and the supervisory command or control command.

In this case, the optical transmitter 611 modulates a carrier by the main signal, superimposes the first sub-signal, converts the resultant electrical signal to the optical signal, and supplies the optical signal to the optical fiber 602-1 (or 602-2).

Subsequently, receiving the optical signal via the optical fiber 602-1 (602-2), the optical amplifying repeater 603 operates as follows. First, the coupler 701 splits the optical signal, and supplies a first part of the optical signal to the Er doped optical fiber 703 via the WDM coupler 702. In this case, the WDM coupler 702 combines the first part of the optical signal with the pumping laser light fed from the pumping laser diode 707. Then, the optical signal amplified by the Er doped optical fiber 703 is launched into the coupler 705 via the isolator 704 to be split by the coupler 705, and a first part of the split optical signal is supplied to the optical fiber 602-1 (602-2). Thus, the main signal is amplified and repeated by the optical amplifier 631-1 (631-2) of the optical amplifying repeater 603.

On the other hand, a second part of the optical signal split by the coupler 701 is converted into an electrical signal by the photoelectric converter 706, and the electrical signal is supplied to the modem unit 651 of the supervisory controller 632. Likewise, a second part of the optical signal split by the coupler 705 is converted into an electrical signal by the photoelectric converter 708, and the electrical signal is supplied to the modem unit 651 of the supervisory controller 632.

The modem unit 651 extracts and demodulates only the first sub-signal from the electrical signal fed from the photoelectric converter 706, and supplies it to the controller 652. The modem unit 651 also measures the power level of the output optical signal from the electrical signal fed from the photoelectric converter 708, and notifies the controller 652 of the power level.

The controller 652, referring to its uniquely assigned address code that is stored in the nonvolatile memory 661, makes a decision as to whether the first sub-signal contains the same address code as the uniquely assigned address code. When the first sub-signal contains the same address code as the uniquely assigned address code, the controller 652 performs the processing corresponding to the supervisory command or control command contained in the first sub-signal. On the other hand, when the first sub-signal does not include the same address code as the uniquely assigned address code, the controller 652 disregards the first sub-signal.

Detecting the supervisory command addressed to the repeater, the controller 652 collects the intra-repeater information in response to the supervisory command. The intra-repeater information includes such information items as the modulation factors of the first and second sub-signals (described later) (the amplitude intensity of the first and second sub-signals) in terms of the main signal, the power levels of the input and output optical signals of the optical amplifying repeater 603, the amplification factors of the optical amplifiers 631-1 and 631-2, and the driving current level for the pumping laser diode 707.

As the supervisory command, there are a start command for starting collection of the intra-repeater information, a selection command for selecting information to be transmitted to the optical receiver 612 from the intra-repeater information after collecting the intra-repeater information, and a transmission command for transmitting the selected information. For example, the optical transmitter 611 sends the start command, and then the selection command after a sufficient time period has elapsed to collect the intra-repeater information, followed by sending the transmission command. Incidentally, the these commands can be sent at once as a single command instead of sending them step by step.

After collecting the intra-repeater information, the controller 652 converts the analog values of the information to digital data, and supplies the data to the modem unit 651. The modem unit 651 generates the supervisory signal by modulating a prescribed subcarrier different from the carrier of the main signal. Then, the modem unit 651 modulates the driving current of the pumping laser diode 707 in the optical amplifier 631-1 and that of the pumping laser diode 707 in the optical amplifier 631-2 by the supervisory signal by controlling the pumping laser diode drivers 653-1 and 653-2, thereby superimposing the supervisory signal on both the uplink and downlink main signals as the second sub-signal. In the course of this, the controller 652 generates the digital data within a predetermined quantization error, temporarily stores the data in a memory not shown, and reads the data of the selected supervisory information from the memory when it detects the selection command.

In addition, detecting the control command addressed thereto, the controller 652 controls the internal circuits such as the modem unit 651 and pumping laser diode drivers 653-1 and 653-2 in response to the control command.

As the control command, there are a reset command for resetting the operation state of the supervisory controller 632 into its initial state, an amplification factor control command for controlling the amplification factors of the optical amplifiers 631-1 and 631-2, and an amplitude intensity control command for controlling the amplitude intensity of the second sub-signal.

When detecting the reset command, the controller 652 resets the operation state of the supervisory controller 632 into its initial state. When detecting the amplification factor control command, it controls the pumping laser diode drivers 653-1 and 653-2 to control the amplification factors of the optical amplifiers 631-1 and 631-2 by adjusting the driving currents to the pumping laser diodes 707. When detecting the amplitude intensity control command, the controller 652 controls the amplitude intensity of the second sub-signal by controlling the modem unit 651 or the pumping laser diode drivers 653-1 and 653-2.

To control the amplitude intensity of the second sub-signal, the controller 652 can set the amplitude intensity of the second sub-signal to the modem unit 651 in the form of m-bit digital data via m signal lines, or in the form of an analog value via a single signal line. In addition, as for the amplitude intensity of the second sub-signal, the controller 652 reads it to check whether it is set at a correct value in accordance with the control command, and makes it one of the intra-repeater information items.

The optical receiver 612 in the far-end line supervisory unit 601 opposing to the line supervisory unit 601 that transmits the supervisory command receives the optical signal via the optical fiber 602-1 or 602-2. After converting the optical signal to the electrical signal, the optical receiver 612 demodulates it to the main signal and first and second sub-signals. Likewise, the optical receiver 612 of the line supervisory unit 601 that transmits the supervisory command receives the second sub-signal via the reverse direction optical fiber 602-2 or 602-1. The line supervisory unit 601 displays the supervisory information obtained from the second sub-signal on a display not shown or prints it out by a printer not shown.

When the supervisory controller 632 does not receive the command addressed thereto, it only drives the pumping laser diodes 707 with a reference current without performing the superimposition of the second sub-signal. Incidentally, the supervision and control of the optical amplifying repeater 603 can be achieved for individual sub-modules 621 via the optical transmission line.

As described above, the present embodiment 1 is configured such that the transmitter 611 transmits the supervisory command to the optical amplifying repeater 603, which in turn transmits the supervisory signal to the optical receivers 612 of the line supervisory units 601 at both ends via both the optical transmission lines in response to the supervisory command. As a result, the line supervisory unit 601 that transmits the supervisory command can acquire the supervisory information corresponding to the supervisory command in a short time. Thus, the present embodiment 1 offers an advantage of being able to supervise the individual optical amplifying repeaters 603 quickly, particularly when the supervisory commands are transmitted successively.

In addition, the present embodiment 1 is configured such that it can control the amplification factors of the optical amplifiers 631-1 and 631-2 and the amplitude intensity of the second sub-signal of each optical amplifying repeater 603 individually. As a result, the present embodiment 1 offers an advantage of being able to control the characteristics of the individual optical amplifying repeaters 603 step by step so that the total gain characteristic of the plurality of optical amplifying repeaters 603 is adjusted to a desired level.

Furthermore, as for the variations or degradation in the output light power of the pumping laser diodes 707 because of the aging, the present embodiment 1 offers an advantage of being able to maintain the amplification factors of the optical amplifying repeaters 603 by adjusting the amplification factors of the optical amplifiers 631-1 and 631-2.

Moreover, the present embodiment 1 is configured such that the feeding circuits 613 installed at both ends of the feeder line 614 supply current to the optical amplifying repeaters 603. As a result, the present embodiment 1 offers an advantage of being able to shorten the average distance from the feeding circuits 613 to the plurality of optical amplifying repeaters 603, thereby making it possible to decrease the supply voltage reduction to the optical, amplifying repeaters 603.

Although the foregoing embodiment is described taking an example where the number of the optical amplifying repeaters 603 is two, it is obvious that any number of the optical amplifying repeaters can be used in the same manner. Besides, although two uplink/downlink optical fibers 602-1 and 602-2 are provided, any number of the optical fibers are applicable.

What is claimed is:

1. An optical repeating system comprising:

an uplink optical transmission line;

a downlink optical transmission line;

an optical transmitter and an optical receiver for transmitting and receiving a main signal via at least one of the uplink and downlink optical transmission lines; and a plurality of optical amplifying repeaters each installed at an intermediate position on the optical transmission lines for amplifying and repeating the main signal with optical amplifiers, wherein said optical transmitter specifies one of said plurality of optical amplifying repeaters, and transmits a first sub-signal containing at least one of a supervisory command and a control command to said specified optical amplifying repeater, the supervisory command commanding to supervise internal circuits of said optical amplifying repeater, and the control command commanding to control amplification factors of said optical amplifiers, and wherein said optical amplifying repeater includes a controller for controlling the amplitude intensity of the supervisory signal in response to the control command, and said optical amplifying repeater transmits, when receiving the supervisory command via one of the uplink and downlink optical transmission lines, a second sub-signal to said optical receiver via said uplink optical transmission line and said downlink optical transmission line, the second sub-signal containing a supervisory signal indicating supervisory result corresponding to the supervisory command, and is controlled to change the amplification factors of said optical amplifiers in response to the control command when receiving the control command via one of said uplink and downlink optical transmission lines.

2. The optical repeating system according to claim 1, further comprising a feeder line installed along said optical transmission lines; and a feeding circuit installed at each end of said feeder line for feeding said plurality of optical amplifying repeaters with a current via said feeder line.

3. An optical amplifying repeater control method of controlling an optical amplifying repeater in an optical repeating system including an uplink optical transmission line, a downlink optical transmission line, an optical transmitter and an optical receiver for transmitting and receiving a main signal via at least one of the uplink and downlink optical transmission lines, and a plurality of optical amplifying repeaters each installed at an intermediate position on the optical transmission lines for amplifying and repeating the main signal with optical amplifiers, said optical amplifying repeater control method comprising the steps of:

specifying one of said plurality of optical amplifying repeaters, and transmitting a first sub-signal containing at least one of a supervisory command and a control command to the specified optical amplifying repeater by said optical transmitter, the supervisory command commanding to supervise internal circuits of said optical amplifying repeater, and the control command commanding to control amplification factors of said optical amplifiers;

receiving at least one of the supervisory command and the control command by said optical amplifying repeater via one of said uplink and downlink optical transmission lines;

transmitting, when said optical amplifying repeater receives the supervisory command via one of the uplink and downlink optical transmission lines, a second sub-signal to said optical receiver via said uplink optical transmission line and said downlink optical transmission line, the second sub-signal containing a supervisory signal indicating supervisory result corresponding to the supervisory command, and controlling, when said optical amplifying repeater receives the control command via one of said uplink and downlink optical transmission lines, the amplification factors of said optical amplifiers in response to the control command; and controlling the amplitude intensity of the supervisory signal in response to the control command.

* * * * *